United States Patent Office 3,637,805
Patented Jan. 25, 1972

3,637,805
2-AMINO-5-ALKOXYTEREPHTHALIC DERIVATIVES
Gottfried Burkhardt, Ludwigshafen (Rhine), and Erwin Hahn, Viernheim, Germany, assignors to Badische Anilin- & Soda-Fabrik Aktiengesellschaft, Ludwigshafen (Rhine), Germany
No Drawing. Filed Aug. 14, 1968, Ser. No. 752,482
Claims priority, application Germany, Aug. 18, 1967, P 16 43 645.6
Int. Cl. C07c 103/24
U.S. Cl. 260—471 R     3 Claims

ABSTRACT OF THE DISCLOSURE

New 2 - acylamino - 5 - alkoxyterephthalic derivatives which are useful as comonomers for optical brightening and light stabilization.

---

This invention relates to 2 - amino - 5 - alkoxyterephthalic derivatives having the general Formula I:

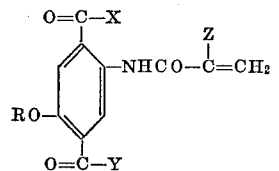

(I)

in which R denotes a low molecular weight alkyl radical, X and Y denote identical or different radicals of low molecular weight alcohols, primary or secondary amines or a $NH_2$ group and Z denotes a hydrogen atom or a lower alkyl radical.

Examples of the radical R are ethyl and propyl and preferably methyl and examples of the radical Z are (in addition to hydrogen) methyl and ethyl.

When the radical X or Y is derived from an alcohol it has the formula $—O—R^1$ in which $R^1$ preferably denotes lower unsubstituted or substituted alkyl radicals having 1 to 4 carbon atoms, such as methyl, ethyl, β-cyanoethyl, β-methoxyethyl, β-carboxymethoxyethyl, propyl or butyl.

Primary or secondary amines from which the radicals X and Y may be derived are for example methylamine, ethylamine, dimethylamine, diethylamine, propylamine, gamma-methoxypropylamine, butylamine or morpholine.

A group of preferred compounds has the general formula:

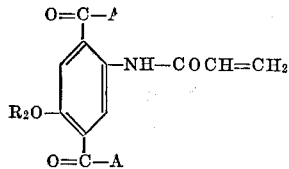

in which A denotes an $OCH_3$, $OC_2H_5$, $n-OC_4H_9$, $iso-OC_4H_9$ or $NH_2$ group and $R^2$ denotes a methyl or ethyl group.

The new compounds having the Formula I may be obtained for example by reaction of 2-aminoterephthalic derivatives having the Formula II:

(II)

with an acrylic halide having the Formula III:

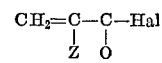

(III)

in which R, X, Y and Z have the above meanings and Hal denotes a chlorine or bromine atom.

Examples of compounds having the Formula II are:

dimethyl 2-amino-5-methoxyterephthalate,
dimethyl 2-amino-5-ethoxyterephthalate,
diethyl 2-amino-5-methoxyterephthalate,
methylethyl 2-amino-5-ethoxyterephthalate,
2-amino-5-methoxyterephthalamide,
2-amino-5-methoxyterephthalic-bis-diethylamide,
2-amino-5-methoxyterephthalic-bis-butylamide, and
2-amino-5-methoxyterephthalic-bis-methoxypropylamide.

Compounds having the Formula II may be prepared for example by the following equation:

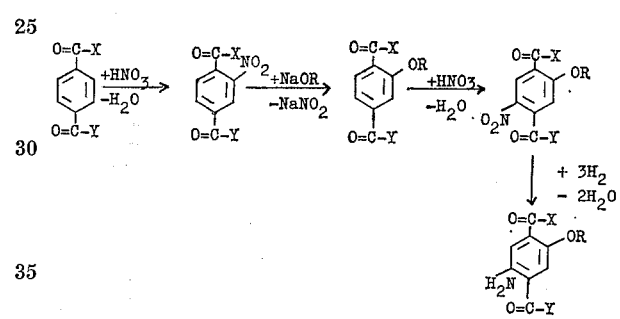

Acrylyl chloride and methacrylyl chloride are preferred as compounds having the Formula III.

In the reaction of compounds having the Formula II with acrylyl halides it is advantageous to proceed by allowing the acrylyl halide to drip at a low temperature, for example at 0° C., into a solution of the 2-aminoterephthalic acid compound.

Examples of suitable solvents are methanol, ethanol, acetone and dioxane and particularly dimethylformamide and N-methylpyrrolidone. When using non-basic solvents it is advisable to add a base such as pyridine, triethylamine or sodium hydroxide, sodium carbonate or potassium carbonate to bind the hydrogen halide liberated during the reaction.

In compounds having the Formula I or II in which X and Y are derived for example from low boiling point alcohols, these groups may also for example be exchanged for radicals of higher boiling point alcohols by transesterification by conventional methods. Conversion into amides by known methods is also possible.

The new compounds having the Formula I are valuable optical brighteners and light stabilizers. They may be used for example as comonomers.

The invention is illustrated by the following examples. Parts and percentages in the examples are by weight.

EXAMPLE 1

99 parts of acrylyl chloride is dripped at 0° to 5° C. into a solution of 239 parts of dimethyl 2-amino-5-methoxyterephthalate in 510 parts of N-methylpyrrolidone. The mixture is stirred for another two hours at 0° to 5° C. and then poured onto ice. After the deposited precipitate has been isolated and dried, 280 parts (i.e. 95.5% of the theory) of the compound having the formula:

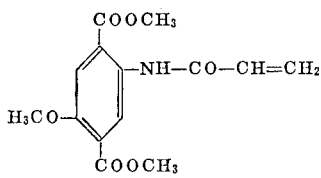

having a melting point of 134° to 136° C. is obtained. The melting point increases to 149° C. upon recrystallization from isobutanol.

The same result is obtained by using 470 parts of dimethylformamide as solvent.

EXAMPLE 2

19.8 parts of acrylyl chloride is dripped at 0° C. into a solution of diethyl 2-amino-5-ethoxyterephthalate which has been prepared by reduction of 62.2 parts of diethyl 2-nitro-5-ethoxyterephthalate in 265 parts of dimethylformamide. The whole is further stirred for two hours. The product is precipitated with ice-water. 36.6 parts of diethyl 2-acryloylamino-5-ethoxyterephthalate is obtained, i.e. 54.6% of the theory calculated on diethyl 2-nitro-5-ethoxyterephthalate.

EXAMPLE 3

47 parts of acrylyl chloride is dripped at 0° to 5° C. into a solution of 105 parts of 2-amino-5-methoxyterephthalodiamide in 395 parts of acetone below which is a layer of 322 parts of saturated aqueous potassium carbonate solution, the two liquids being thoroughly mixed. The whole is stirred for another two hours and then diluted with water. 130 parts of the acylated compound (i.e. 99% of the theory) is obtained.

EXAMPLE 4

29.3 parts of dimethyl 2-acryloylamino-5-methoxyterephthalate is boiled with 100 parts of absolute ethanol and 1 part of potassium carbonate under reflux for seventeen hours, and then diluted with water. 26 parts of the methyl ethyl ester is obtained, i.e. 85% of the theory. The melting point of this compound is 110° to 111° C. after it has been recrystallized from ethanol.

EXAMPLE 5

27 parts of acrylyl chloride is dripped at 0° to 5° C. into 87 parts of 2-amino-5-methoxyterephthalic-bis-butylamide dissolved in 204 parts of N-methylpyrrolidone. After having been stirred for another two hours, the whole is diluted with ice-water and the deposited precipitate is isolated. The yield is 98 parts, i.e. 97.5% of the theory; the melting point is 136° to 138° C.

EXAMPLE 6

7.2 parts of methacrylyl chloride is dripped at 0° to 5° C. into 22 parts of 2-amino-5-methoxyterephthalic-bis-methoxypropylamide dissolved in 102 parts of N-methylpyrrolidone. The whole is stirred for another two hours and a little ice-water is added. The reaction mixture is then shaken up three times, each time with 200 parts of methylene chloride. The methylene chloride solutions are united, dried with $Na_2SO_4$ and freed from solvent. The residue is recrystallized from butyl acetate. 21 parts of the acylated product is obtained, i.e. 75% of the theory. The compound has the formula:

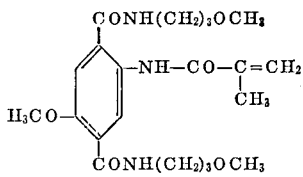

We claim:

1. A 2-amino-5-alkoxyterephthalic derivative having the general formula:

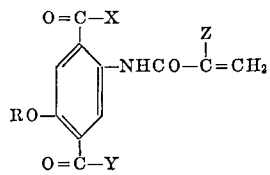

in which R denotes a low molecular weight alkyl radical, X denotes —O—$R^1$ wherein $R^1$ is an alkyl group having 1 to 4 carbon atoms or alkyl having 1 to 4 carbon atoms and substituted with cyano, methoxy or carbomethoxy radicals, a primary or secondary lower alkyl amino group, a gamma-methoxy-propylamino group, morpholino, or a $NH_2$ group, Y denotes —O—$R^1$ wherein $R^1$ is an alkyl group having 1 to 4 carbon atoms or alkyl having 1 to 4 carbon atoms and substituted with cyano, methoxy or carbomethoxy radicals, a primary or secondary lower alkyl amino group, a gamma-methoxypropylamino group, morpholino, or a $NH_2$ group, and Z denotes a hydrogen atom or a lower alkyl radical.

2. A 2-amino-5-alkoxyterephthalic derivative having the general formula:

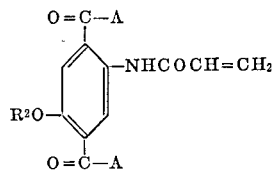

in which A denotes a $OCH_3$, $OC_2H_5$, n-$OC_4H_9$, iso-$OC_4H_9$ or $NH_2$ group and $R^2$ denotes a methyl or ethyl group.

3. The compound having the formula:

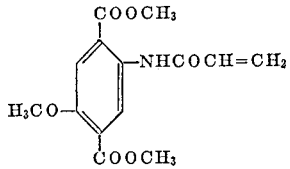

References Cited

UNITED STATES PATENTS 3,312,695    4/1967    Mühle.

LORRAINE A. WEINBERGER, Primary Examiner

L. A. THAXTON, Assistant Examiner

U.S. Cl. X.R.

260—247.2 A, 465 D, 465 K, 559 S